United States Patent [19]
Sherepa et al.

[11] Patent Number: 5,528,925
[45] Date of Patent: Jun. 25, 1996

[54] METHOD AND APPARATUS FOR TESTING THE SEAL BETWEEN A CONTAINER AND A FLEXIBLE LID

[75] Inventors: Andrew Sherepa, Duluth, Minn.; Mark Berg, Foxboro, Wis.; Rod Ledoux, Duluth, Minn.; Lennie Polecheck, Superior, Wis.

[73] Assignee: Luigino's, Inc., Duluth, Minn.

[21] Appl. No.: 292,923

[22] Filed: Aug. 18, 1994

Related U.S. Application Data

[63] Continuation of Ser. No. 6,305, Jan. 19, 1993, abandoned.

[51] Int. Cl.$^6$ .............................. G01M 3/00; B65B 57/02
[52] U.S. Cl. .................... 73/41; 73/49.3; 73/52; 53/52; 53/505; 53/507
[58] Field of Search ................. 73/49.3, 41, 52, 73/45, 45.4; 209/597, 598, 599, 600, 601, 604; 53/53, 52, 505, 507

[56] References Cited

U.S. PATENT DOCUMENTS

| | | | |
|---|---|---|---|
| 2,836,296 | 5/1958 | Lewis et al. | 209/599 |
| 2,960,223 | 11/1960 | Fauth | 209/597 |
| 3,396,842 | 8/1968 | Bowen et al. | 209/599 |
| 3,416,360 | 12/1968 | Ochs | 209/597 |
| 3,586,165 | 6/1971 | Keinanen | 53/53 |
| 3,708,940 | 1/1973 | Wilcox | 53/53 |
| 3,880,749 | 4/1975 | Ramsay | 209/597 |
| 3,918,293 | 11/1975 | Feigel | 73/49.3 |
| 3,955,678 | 5/1976 | Moyer | 209/564 |
| 4,165,277 | 8/1979 | Frewin | 209/3.3 |
| 4,517,827 | 5/1985 | Tapscott | 73/49.3 |
| 4,680,463 | 7/1987 | Lutgendorf et al. | 250/223 B |
| 4,697,452 | 10/1987 | Prakken | 73/49.3 |
| 4,706,494 | 11/1987 | Creed et al. | 73/49.3 |
| 4,730,482 | 3/1988 | Cerny et al. | 73/49.3 |
| 4,841,763 | 6/1989 | Kang et al. | 73/49.3 |
| 5,230,239 | 7/1993 | Gentile | 73/49.3 |

*Primary Examiner*—Michael J. Brock
*Attorney, Agent, or Firm*—Kinney & Lange

[57] ABSTRACT

A method and apparatus for testing the seal between a container and a flexible lid by measuring the lid's deflection. In the disclosed embodiment, an actuator impacts the lid and activates an alarm if the lid is not securely attached to the container.

33 Claims, 5 Drawing Sheets

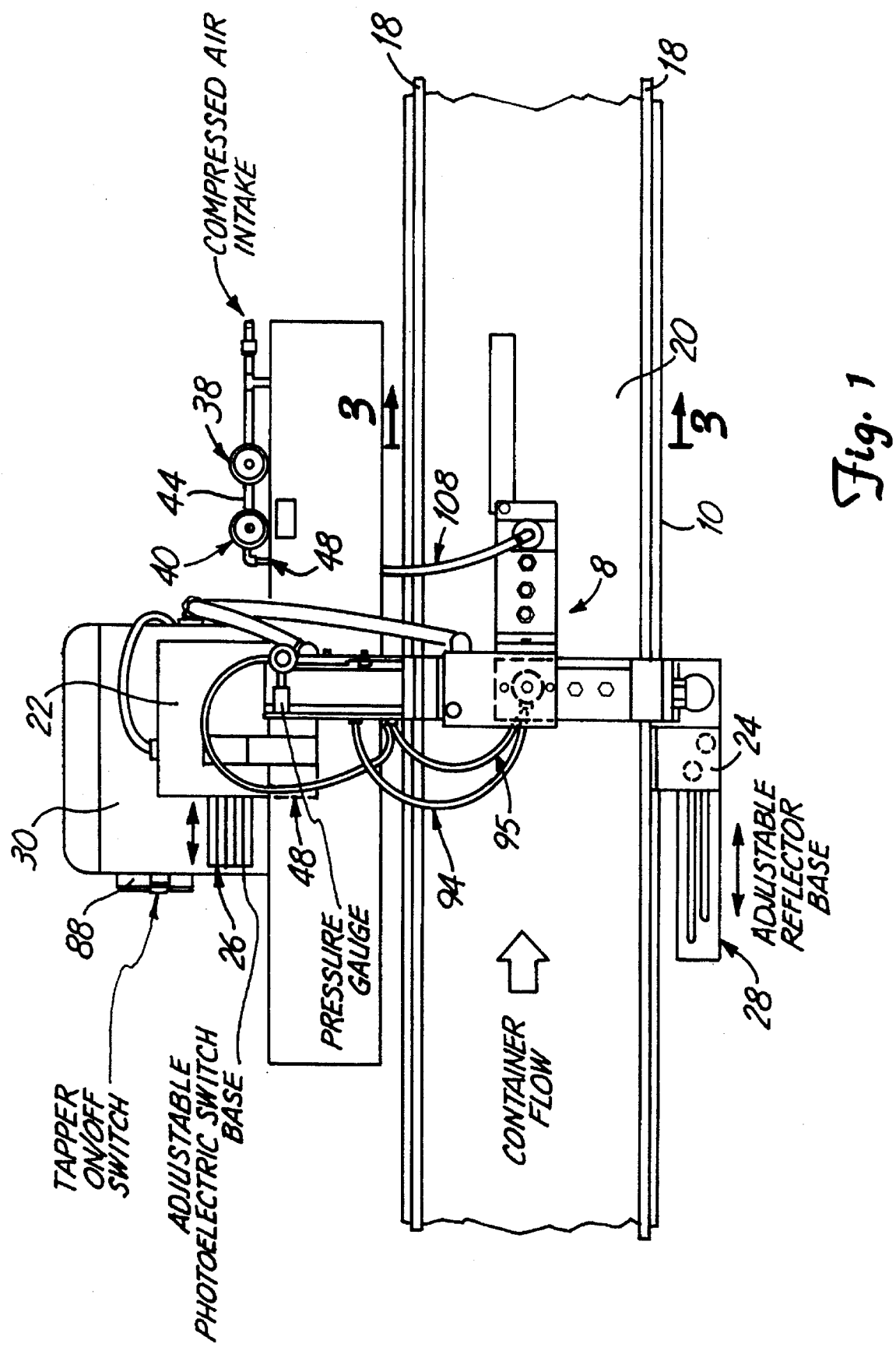

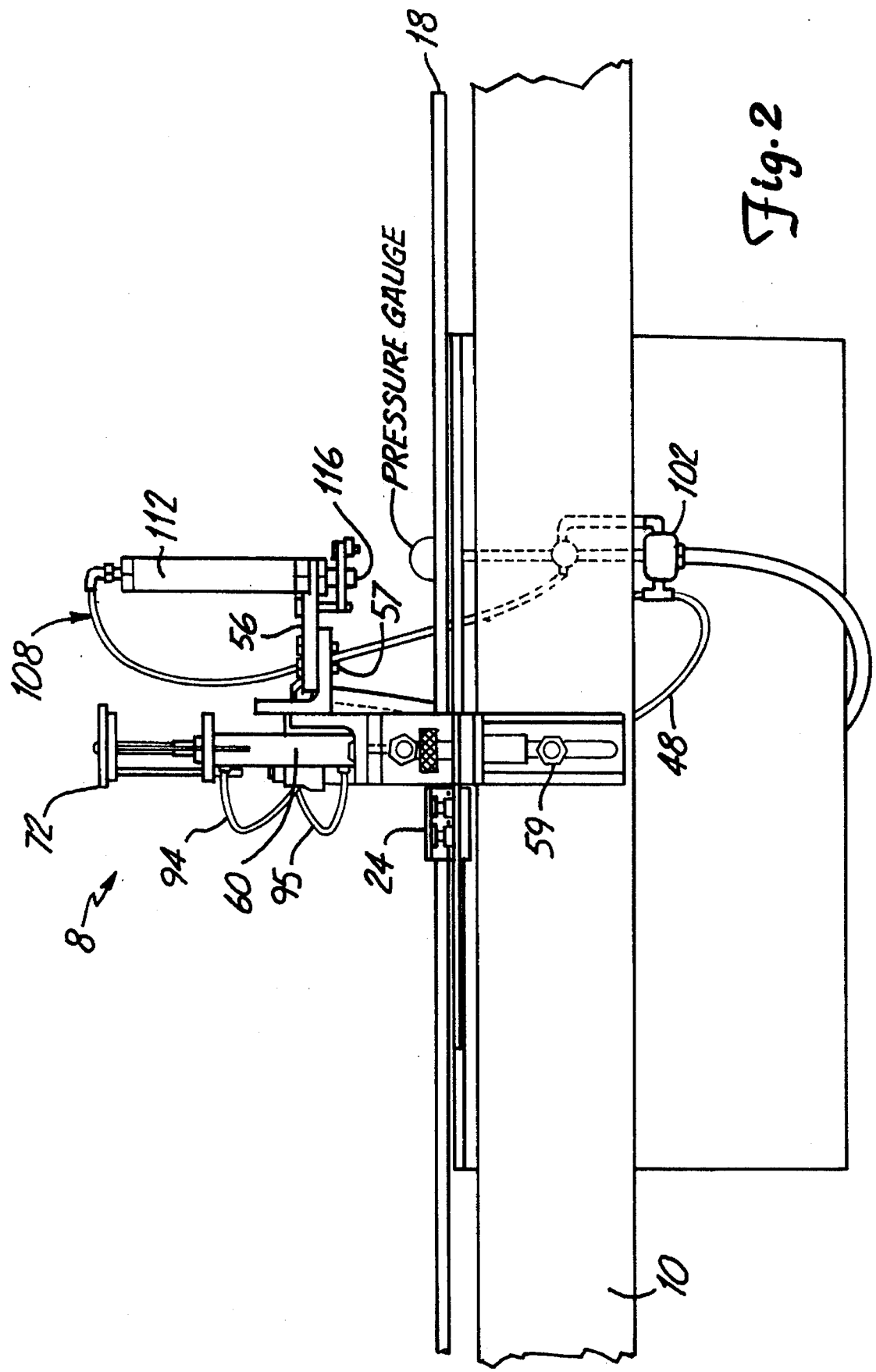

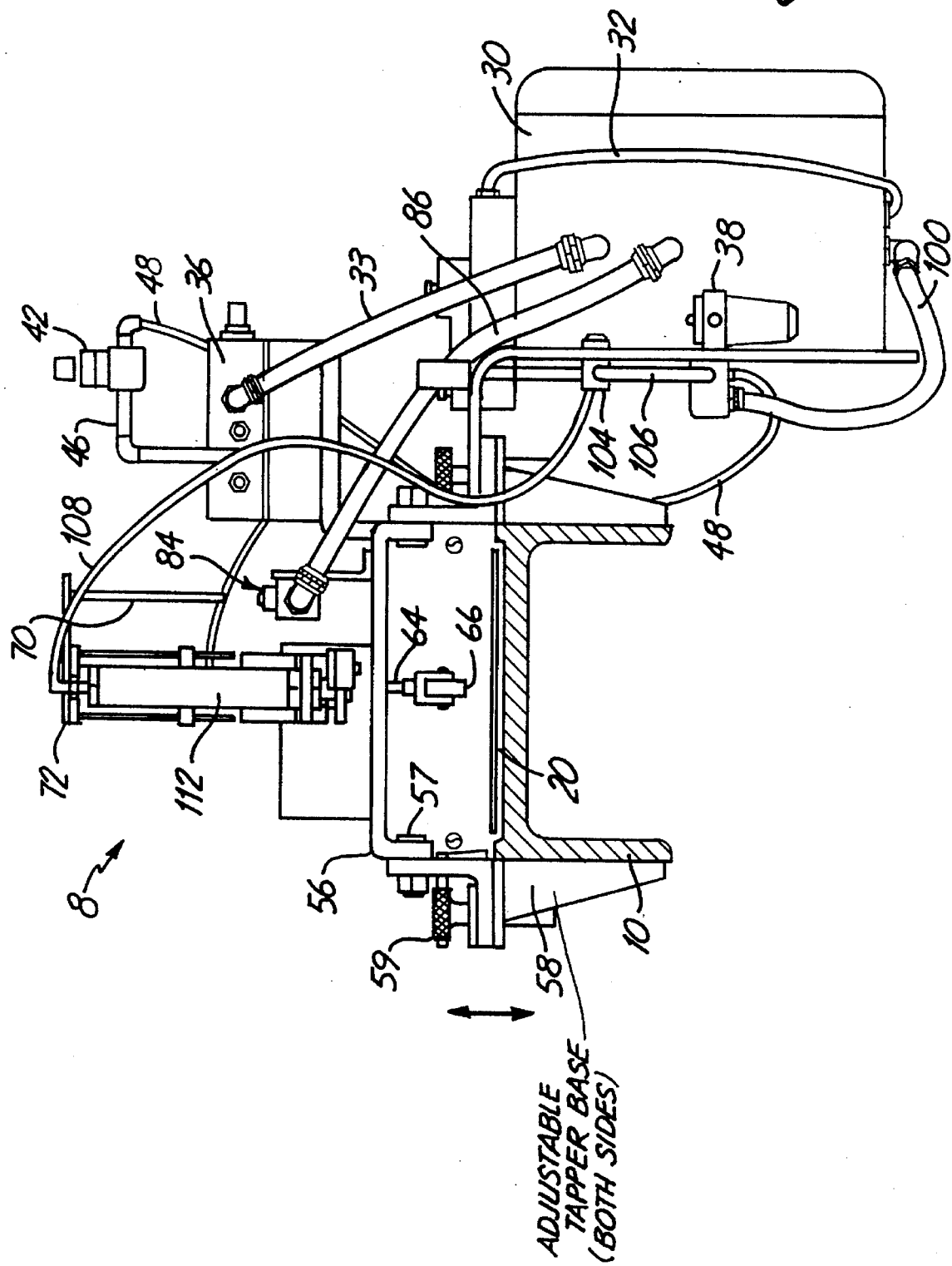

5,528,925

METHOD AND APPARATUS FOR TESTING THE SEAL BETWEEN A CONTAINER AND A FLEXIBLE LID

This is a file wrapper continuation of application Ser. No. 08/006,305, filed Jan. 19, 1993, now abandoned.

FIELD OF THE INVENTION

This invention relates in general to testing the seal between a container and its lid. More particularly, it relates to a method and apparatus for automatically identifying containers having improperly sealed lids.

BACKGROUND OF THE INVENTION

Food and other products are often packaged in containers made from flexible, lightweight, and sturdy materials such as plastic or cardboard. The assignee of the present invention, Luigino's, Inc. of Duluth, Minn., uses a variety of flexible containers for its frozen entrees. One of the later steps on the production line for packaging these entrees is to attach a lid to the container and heat seal the lid in place.

In order to preserve quality, it is essential that each lid's seal is checked. Otherwise, improperly sealed containers will continue through the production line and possibly be shipped to customers. In the past, each container was manually checked by a line operator. Thus, there is a need for an automatic method and apparatus for identifying containers having improperly sealed lids.

It is an object of the present invention to provide a method and apparatus for the automatic identification of improperly sealed lids.

One embodiment of the invention features an air-driven pneumatic cylinder and piston arrangement ("actuator"), including first and second rods attached to the piston. A container is brought under the first rod, and the piston is moved downward. As the first rod impacts the container's lid, the first and second rods "measure" the lid's deflection. If the lid is securely sealed, the lid's deflection is minimal, and thus, the first rod does not travel significantly beyond its point of impact with the lid. If the lid is not securely sealed, the lid deflects and allows the second rod to travel far enough to contact and activate an alarm.

Thus, it is an advantage of this invention that improperly sealed lids are automatically identified in a reliable and efficient manner. It is a further advantage of this invention that human resources are saved by eliminating the need for a manual inspection of each lid's seal.

SUMMARY OF THE INVENTION

To achieve the foregoing objects, features and advantages, the inventive apparatus for identifying an improperly sealed lid comprises an actuator capable of determining the deflection of the lid and identifying when the deflection exceeds a predetermined amount.

BRIEF DESCRIPTION OF THE DRAWINGS

A greater appreciation of the objects, features and advantages of the present invention may be understood by the following detailed description taken in conjunction with the attached drawings wherein;

FIG. 1 illustrates a plan view of one embodiment of the present invention;

FIG. 2 illustrates a side view of the embodiment illustrated in FIG. 1;

FIG. 3 illustrates a partial sectional view of the embodiment illustrated in FIG. 1;

DETAILED DESCRIPTION OF THE PREFERRED EMBODIMENT OF THE INVENTION

FIGS. 1–3 illustrate a testing apparatus 8 embodying the present invention. The testing apparatus 8 is mounted to a conveyor system 10 and conveyor belt 20. In a typical high-volume production line, the conveyor belt 20 is in continuous movement. Guard rails 18 are located along each side of the conveyor belt 20 to prevent objects from falling off the conveyor belt 20.

Figure 4B:
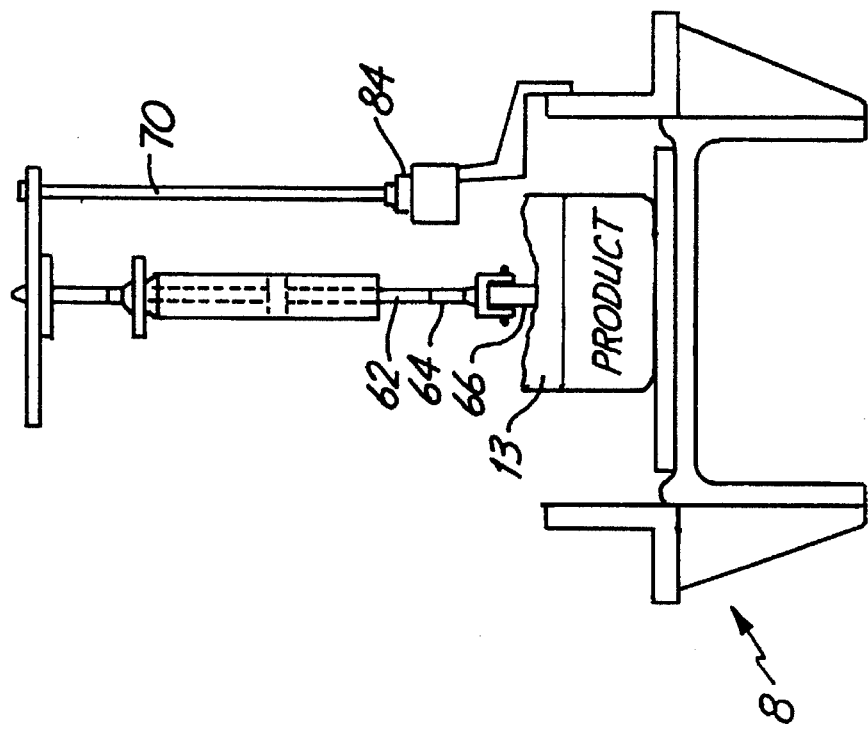
FIGS. 4a and 4b illustrate a partial sectional sketch of the embodiment, along with a flexible container and lid.
Figure 4A:
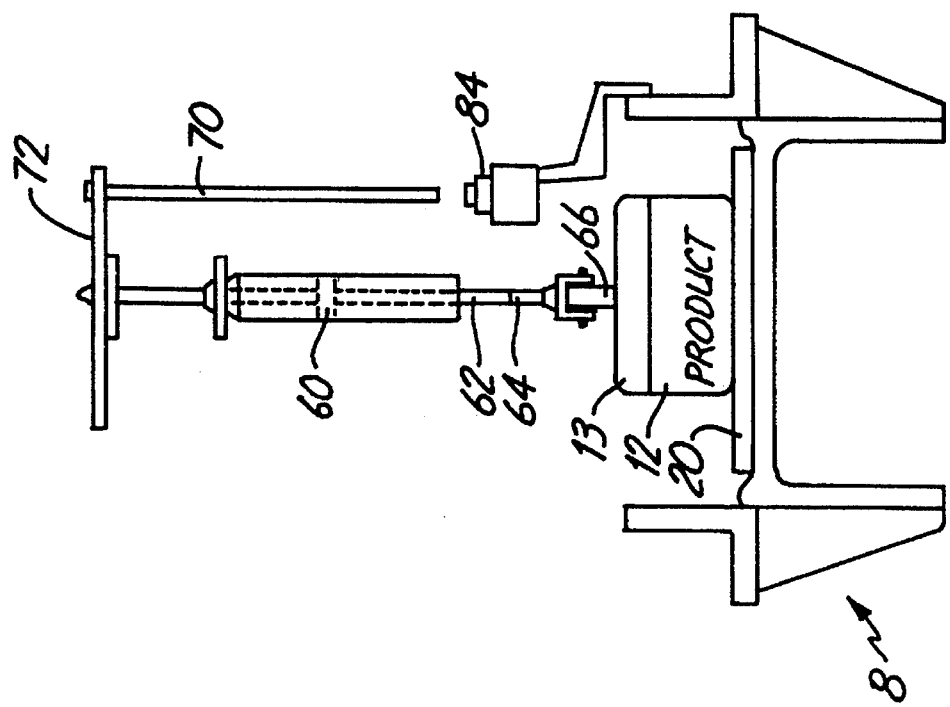

The testing apparatus 8 is best utilized to test the seal between a container and a lid made of flexible material such as plastic or cardboard. FIGS. 4a and 4b illustrate a suitable container 12 and lid 13. The testing apparatus 8 is advantageously placed downstream of a "lidder" (not shown), which attaches and seals lids 13 to the containers 12. As best seen in FIG. 1, the containers 12 flow to the testing apparatus 8 from the left.

Individually, many of the elements of the testing apparatus 8 are known. However, it is the unique combination of these elements that forms the disclosed embodiment of the invention. This detailed description discusses the overall functions performed by each element and how these elements cooperate in the inventive apparatus and method. The following list sets forth several elements of the testing apparatus 8, along with suitable commercial devices for performing the elements' functions.

| ELEMENT | COMMERCIAL DEVICE |
| --- | --- |
| Air-driven pneumatic cylinders (60, 112) | AURORA ™ 6 inch Pneumatic Cylinder |
| Transceiver (22) | OMRON ™ Photoelectric Switch |
| Fiberglass enclosure (30) | NEMAFOUR ™ Fiberglass Enclosure |
| Electric hoses (32, 86) | ULTRATITE ™ ½ inch Hose |
| Timer (34) | OMRON ™ H3CA Timer |
| Air valves (36, 92, 102) | SMC ™ Air Valve |
| Water trap (38) | NORGREN ™ Water Trap |
| Lubricator (40) | SMC ™ Lubricator |
| Pressure Regulators (42, 104) | NORGREN ™ Air Pressure Regulator |
| Switch (84) | Micro Switch/Alarm Contact - Available from a variety of manufacturers |
| Buzzer (88) | EDWARDS ™ GS Audible Signal Appliance |

The testing apparatus 8 includes means for detecting the presence of a container 12 on the conveyor belt 20. In the preferred embodiment, the means for detecting includes a transceiver 22 and reflector 24. The transceiver 22 sends a light signal or beam to the reflector 24 which reflects the beam back to the transceiver 22. Containers 12 moving on the conveyor belt 20 break the beam as they reach the transceiver 22 and reflector 24.

The transceiver 22 and reflector 24 are each attached to an adjustable base, 26 and 28 respectively. Each base 26, 28 may be adjusted in the horizontal plane to move the transceiver 22 and reflector 24 closer to or further away from the testing apparatus 8.

The transceiver 22 is connected to a fiberglass enclosure 30, which houses and protects many of the wire connections of the testing apparatus 8. Also included in the enclosure 30 is a timer (not shown), which controls the dwell time of the transceiver 22.

When the transceiver 22 detects a container 12 on the conveyor belt 20, the transceiver 22 sends an electric signal to the timer via an electric hose 32, and also sends an electric signal to air valve 36 via electric hose 33. The hoses 32, 33 each include an electric wire surrounded by a thick rubber hose, which allows safe electrical connections in a wet environment. The transceiver 22 also includes programmable controls, which are set to delay the signal on electric hose 33 until the conveyor belt 20 has moved the container 12 under the cylinder 60.

Air valve 36 is connected at its input port to pipe 46, which supplies compressed air from a regulator 42. The air valve 36 is connected at its output ports to lines 94 and 95. Line 94 is connected to a top section of cylinder 60, and line 95 is connected to a bottom section of cylinder 60. When the air valve 36 receives a signal from hose 33, the air valve 36 is opened to line 94, thereby introducing compressed air into the top section of the cylinder 60.

In most food processing plants, high-pressure compressed air is available from other operations in the plant. However, this compressed air should be expanded and treated prior to its use by the testing apparatus 8.

In the preferred embodiment, high pressure compressed air is passed through a water trap 38, which filters out water and other particles. The filtered air then travels via pipe 44 to a lubricator 40, which injects the air with a mist of oil. The air then travels via pipe 48 to the air pressure regulator 42, which decreases the air pressure to the amount that is needed in cylinder 60. The compressed air then travels via pipe 46 to the air valve 36, which holds the air until a signal on electric hose 33 opens the air valve 36 to line 94.

The cylinders 60, 112 may be mounted to the conveyor system 10 in any stable manner. In the disclosed embodiment, the cylinders 60, 112 are mounted by a series of brackets 56 and screws 57 (only selected screws and brackets are numbered in the Figures). An adjustable base 58 and bolt 59 are mounted at each side of the conveyor belt 20. By turning the bolt 59, the vertical distance between the conveyor belt 20 and the cylinder 60 may be adjusted.

The cylinder 60 includes a reciprocating piston 62, which can move back and forth between two extreme positions. The piston 62 is attached at one end to a first rod 64, which is further attached to a rotatable wheel 66. The piston 62 is also attached to a second rod 70 via a plate 72. As compressed air enters the top section of the cylinder 60, the piston is forced downward from one extreme position to a second extreme position, thereby forcing the first rod 64 and the second rod 70 downward.

The first rod 64 and wheel 66 are positioned above the conveyor belt 20 so that containers 12 moving on the conveyor belt 20 pass under the wheel 66. The transceiver 22 includes programmable controls which are set to delay the signal on electric hose 33 until the container 12 is under the wheel 66. Thus, as compressed air forces the piston 62 downward, the wheel 66 impacts the flexible lid 13. As the conveyor belt 20 moves the container 12 and lid 13, the wheel 66 rolls across the lid 13.

A flexible lid 13 that is properly sealed to the container 12 will be substantially rigid. As shown in FIG. 4a, when the wheel 66 contacts a substantially rigid lid 13, the wheel 66 does not progress significantly beyond its initial point of impact. However, if the flexible lid 13 is improperly sealed to the container 12, as shown in FIG. 4b, the wheel 66 deflects the lid 13, thereby allowing the wheel 66 to proceed beyond its initial point of impact.

The second rod 70 mimics the vertical movements of the first rod 64 and wheel 66. In order to indicate when the wheel 66 has contacted an improperly sealed lid 13, a switch 84 is placed in the path of the second rod 70 at a predetermined distance away from the second rod 70. The predetermined distance is chosen so that the second rod 70 will not contact the switch 84 unless the wheel 66 moves beyond its initial point of impact with the lid 13. Thus, whenever the wheel 66 impacts an improperly sealed lid 13, the lid 13 deflects, and the second rod 70 moves far enough to contact the switch 84. When contacted, the switch 84 activates a buzzer 88 (shown in FIG. 1) by sending a signal via electric hose 86 through the enclosure 30.

The air valve 36 includes internal switching, which can close air flow to line 94 and open air flow to line 95. The air valve 36 further includes programmable controls which close line 94 and open line 95 at a predetermined time after the signal on electric hose 33 opens the air valve 36 to line 94. This predetermined time is set to occur just before the container 12 passes the wheel 66.

When line 95 is open, compressed air is introduced into the bottom section of the cylinder 60, thereby forcing the piston 62 upward toward its first extreme position and away from the conveyor belt 20. At the same time, the wheel 66 and the second rod 70 also move upward in a direction away from the conveyor belt 20. The piston remains in its first extreme position until the transceiver 22 beam is broken by the next container 12 on the conveyor belt 20, thus starting the cycle again.

It may also be desirable to automatically mark the improperly sealed containers so that they can be easily identified. This may be accomplished by providing a second air-driven pneumatic cylinder 112, which includes a reciprocating piston (not shown) connected to a marker 116. When switch 84 is activated, it opens an electric control valve 102 by sending a signal via the enclosure 30 and an electric hose 100. When valve 102 is open, compressed air is passed through a pipe segment 106 to a regulator 104, through a line 108 to the cylinder 112. The valve 102 may include sufficient electronics to delay opening until the container 12 is under the marker 116. The compressed air forces the piston and marker 116 down into contact with the lid 13, thereby marking the unsealed lid 13. Suitable air relief means (not shown) may be provided to raise marker 116 in a similar manner as the wheel 66. Alternatively, the cylinder 112 may be constructed such that the removal of air pressure creates a vacuum in the cylinder, thereby forcing the piston back to its original position.

Figure 5:
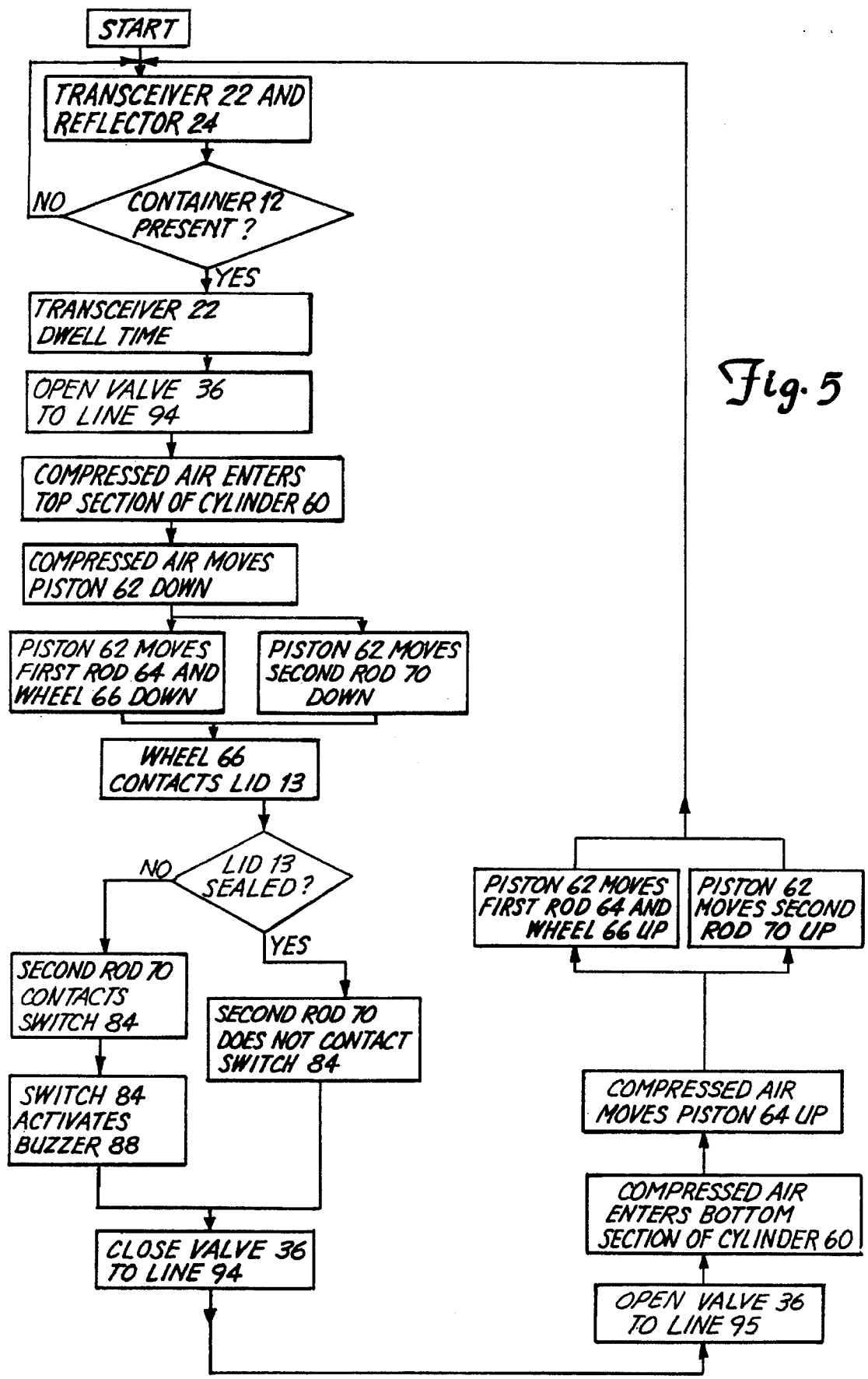
FIG. 5 is a flow chart illustrating the method of the embodiment shown in FIG. 1.

The disclosed embodiment is further illustrated by the flow chart shown in FIG. 5. As seen in FIG. 5, the transceiver 22 and reflector 24 monitor the conveyor belt 20 for the presence of a container 12. When a container 12 is detected, the transceiver 22 initiates its dwell time, waits until the container 12 is under the cylinder 60, and then signals the air valve 36 to open line 94, thereby allowing compressed air into the top section of the cylinder 60. The compressed air forces the piston 62, the first rod 64, the wheel 66 and the second rod 70 downward.

The wheel 66 then impacts the container's lid 13. If the lid 13 is properly sealed to the container 12, the lid's deflection is minimal, and thus, the second rod 70 is prevented from proceeding far enough to contact the switch 84 and activate the buzzer 88. If the lid 13 is improperly sealed, the lid's deflection is sufficient to allow the second rod 70 to proceed far enough to contact the switch 84 and activate the buzzer 88. The switch 84 may also activate a marker 116 which marks the unsealed lid 13 in the manner described above. The buzzer 88 notifies operators working at other stations on the conveyor system 10 that the lid 13 is not properly sealed to the container 12. Thus, there is no need to provide operators who devote time to identifying improperly sealed lids. Improperly sealed lids are automatically identified, and the operator need only remove the container whenever the buzzer sounds.

Before the container 12 passes the wheel 66, air valve 36 closes line 94, thereby cutting off the flow of compressed air to the top section of the cylinder 60. At approximately the same time, the valve 36 opens line 95, which allows compressed air to flow into a bottom section of the cylinder 60, thereby forcing the piston 62, the first rod 64, the wheel 66 and the second rod 70 upward. By now, the dwell time has expired, and the transceiver 22 is again monitoring the conveyor belt 20 for the presence of the next container 12.

The particular values for the various parameters of the apparatus 8 may be set according the demands of each individual application. For example, the air pressure in the cylinder 60 from line 94 must be high enough to test the deflection of the lid 13, but not so high that the piston 62 and wheel 66 crush the container 12. In the preferred embodiment, the regulator 42 keeps the pressure in line 94 in the range from approximately 8 to approximately 12 lbs. This range can accommodate a conventional cardboard lid used in frozen entree packaging.

Thus, it can be seen that the testing apparatus 8 provides an efficient and reliable method of identifying improperly sealed lids on containers by measuring the lid's deflection. The need for manual inspection of containers is eliminated, thus saving significant man-hours and allowing increased production speeds, if desired.

While the above-described embodiment of the invention is preferred, those skilled in the art will recognize modifications of structure, arrangement, composition and the like, which do not part from the true scope of the invention. For example, communication between the elements is preferably electrical but may also be accomplished by mechanical or optical communication. The internal controls for the transceiver 22 and air valve 36 may be digital, analog, optical or mechanical. Additionally, the controls may be centralized at a central processor. The air valve's (36) function may be implemented by a plurality of separate valves. The flexible lid 13 may be attached to container 12 that is either flexible or rigid.

The invention, including the above-described alternatives to the preferred embodiment and equivalents thereof, is covered by the appended claims.

We claim:

1. An apparatus for identifying an improperly sealed lid of a container, the apparatus comprising:

a conveyor with a moving portion, the moving portion capable of moving the container;

a detector in working relation with the moving portion, the detector comprising an actuator that is capable of impacting the lid to determine the lid's deflection; and wherein the detector is capable of identifying the improperly sealed lid as the moving portion moves the container.

2. The apparatus defined in claim 1 wherein said actuator is a movable piston.

3. The apparatus defined in claim 1 wherein the detector is capable of determining deflection of the lid and wherein the detector is capable of activating an alarm when the lid deflection exceeds a predetermined amount.

4. The apparatus of claim 1, and further comprising:

means for securing said actuator to said conveyor.

5. The apparatus of claim 1, and further comprising detection means for detecting when a container moving on the moving portion of the conveyor passes a predetermined point.

6. The invention defined in claim 5 wherein said detection means comprises:

a transceiver for emitting light signals; and a reflector for reflecting said light signals back to said transceiver.

7. The apparatus of claim 5 wherein said detection means is capable of activating the detector in response to a container on the moving portion of the conveyor passing the predetermined point.

8. A method for testing a lid of a moving container, the method comprising the steps of:

determining the deflection of the lid that occurs during testing of the lid while the container is moving; and identifying when the deflection exceeds a predetermined value.

9. The method defined in claim 8 wherein the lid's deflection is determined by impacting the lid with an actuator.

10. The method defined in claim 9, and further comprising the step of:

activating said actuator when the container passes a predetermined point.

11. The method defined in claim 8 wherein said identification comprises activating an alarm.

12. A system for testing a lid that is attached to a container, the system comprising:

means for conveying the container and means for determining deflection of the lid that occurs as the means for conveying moves the container.

13. The system of claim 12 wherein the means for determining deflection of the lid comprises a drive cylinder and means for impacting the lid, the means for impacting the lid in working relationship with the cylinder such that the cylinder is capable of forcing the means for impacting toward the lid.

14. The system of claim 13 wherein the means for impacting the lid comprises a wheel oriented to roll along the lid as the wheel impacts the lid.

15. The system of claim 12, and further comprising means for activating an alarm when deflection of the lid exceeds a predetermined amount.

16. The system of claim 12, and further comprising means for marking the container when deflection of the lid exceeds a predetermined amount.

17. The system of claim 12, and further comprising means for detecting the container and activating the means for determining deflection of the lid as the container moves toward the means for determining deflection of the lid.

18. A system for testing a lid that is attached to a container, the system comprising:

a conveyor, the conveyor capable of moving the container;

a first actuator;

a first member in fixed relation with the first actuator;

a second member in fixed relation with the first actuator, the first and second members disposed out of alignment and substantially parallel with respect to each other;

a wheel connected to the first member, the wheel capable of impacting the lid and the wheel oriented to roll along the lid as the wheel impacts the lid;

a detector, the detector capable of detecting deflection of the lid;

wherein the container is located on the conveyor and moves relative to the first actuator during detection of deflection of the lid; and wherein the first actuator is capable of moving the first member toward the lid during testing of the lid.

19. The system of claim 18 wherein the first actuator is capable of and further comprising:

marking means for marking the container when deflection of the lid exceeds a predetermined amount.

20. The system of claim 19 wherein the marking means comprises a marker and a second actuator, the marker in working relationship with the second actuator and the marker capable of marking the lid.

21. A system for testing a lid that is attached to a container, the system comprising:

means for conveying the container;

means for detecting deflection of the lid as the means for conveying moves the container;

wherein the means for detecting comprises an actuator and means for impacting the lid, the means for impacting the lid in working relationship with the actuator such that the actuator is capable of forcing the means for impacting toward the lid; and wherein the means for impacting the lid comprises a wheel oriented to roll along the lid as the wheel impacts the lid.

22. The system of claim 21, and further comprising means for activating an alarm when deflection of the lid exceeds a predetermined amount.

23. The system of claim 21, and further comprising means for marking the container when deflection of the lid exceeds a predetermined amount.

24. The system of claim 21, and further comprising means for detecting the container and activating the means for detecting deflection of the lid as the container moves toward the means for detecting deflection of the lid.

25. A system for testing a lid that is attached to a moving container, the system comprising:

a first actuator;

a first rod in fixed relation with the first actuator;

a second rod in fixed relation with the first actuator, the first and second rods disposed substantially parallel with respect to each other; and a wheel connected to the first rod for impacting the lid and oriented to roll along the lid as the wheel impacts the lid.

26. The system of claim 25 and further comprising:

a detector, the detector capable of detecting deflection of the lid; and marking means for marking the lid when deflection of the lid exceeds a predetermined amount.

27. The system of claim 26 wherein the marking means comprises a marker and a second actuator, the marker in working relationship with the second actuator and the marker capable of marking the lid.

28. An apparatus for identifying an improperly sealed lid of a container, the lid having a proper position on the container when properly sealed, the apparatus comprising:

a first member, the first member capable of impacting the lid when the container is placed in a testing position relative to the first member, and the first member spaced a first distance from where the lid would be if the lid were in the proper position when the container is positioned in the testing position;

a second member in fixed relation with the first member;

a switch in working relation with the first member and the second member; and wherein movement of the first member any distance greater than the first distance will cause the second member to activate the switch.

29. A method for identifying an improperly sealed lid of a container the method comprising:

positioning the container in a testing position relative to a first member, the lid having a proper position on the container when the lid is properly sealed;

spacing the first member a first distance from where the lid would be if the lid were in the proper position, the first member capable of impacting the lid when the container is positioned in the testing position;

placing a second member in working relation with a switch;

placing the second member in working relation with the first member, movement of the first member any distance greater than the first distance causing the second member to activate the switch;

determining the deflection of the lid; and identifying when the deflection exceeds a predetermined value.

30. A method for identifying an improperly sealed lid of a moving container, the method comprising the steps of:

determining the deflection of the lid by impacting the lid with an actuator while the container is moving; and identifying when the deflection exceeds a predetermined value.

31. The method of claim 30, and further comprising the step of:

activating the actuator when the container passes a predetermined point.

32. A system for testing a lid that is attached to a container, the system comprising:

means for conveying the container;

means for detecting deflection of the lid as the means for conveying moves the container, the means for detecting deflection of the lid comprising:

a drive cylinder, and means for impacting the lid; and wherein the means for impacting the lid is in working relationship with the cylinder such that the cylinder is capable of forcing the means for impacting toward the lid.

33. The system of claim 32 wherein the means for impacting the lid comprises a wheel oriented to roll along the lid as the wheel impacts the lid.

* * * * *